J. EASTERLY.
Base Burning Stove.
No. 3,009. Reissued June 30, 1868.
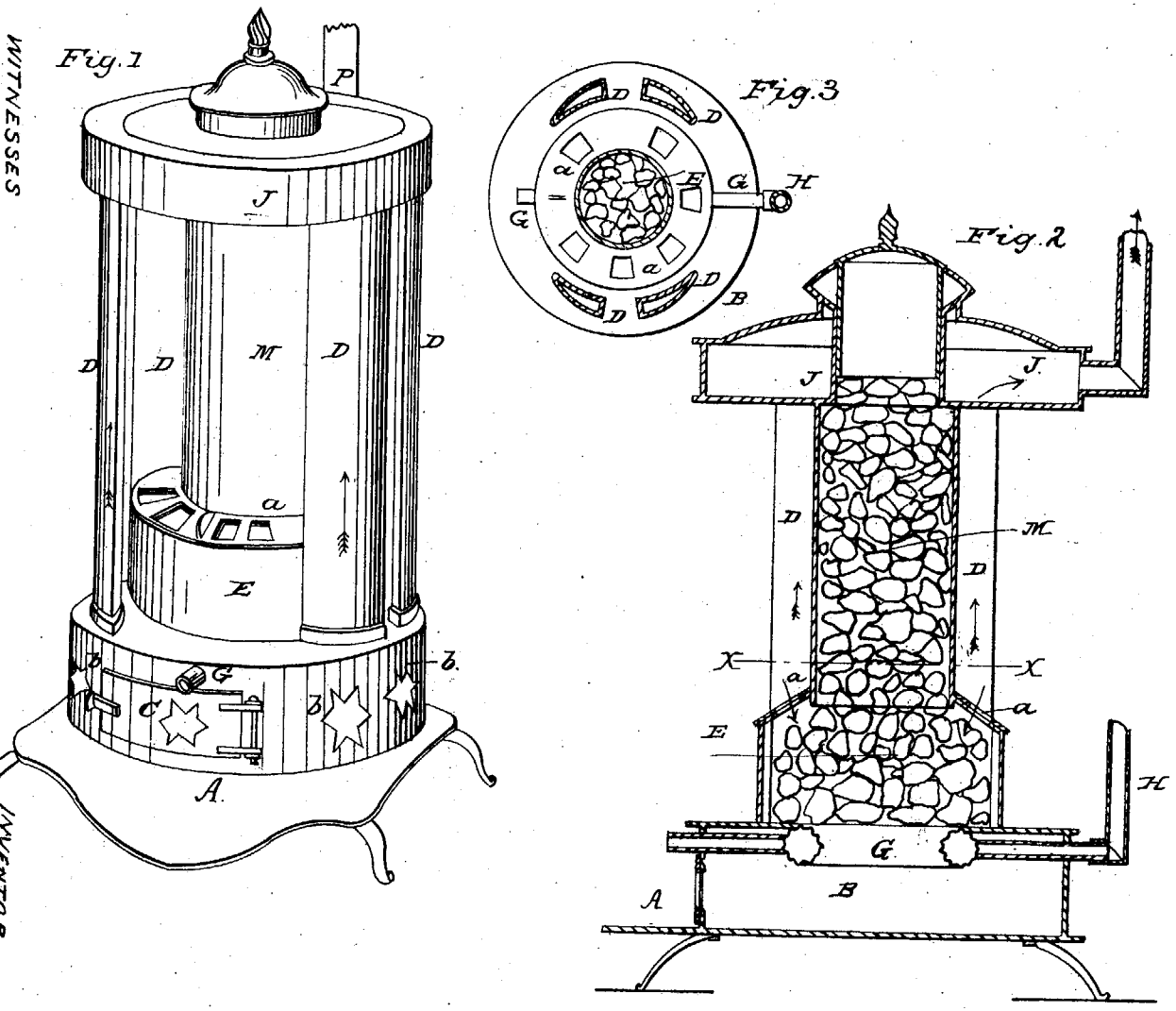
WITNESSES
R. H. Campbell
Edw. Schaffer
INVENTOR
James Easterly
by
Mason Fenwick & Lawrence
N. PETERS, Photo-Lithographer, Washington, D. C.

United States Patent Office.

JAMES EASTERLY, OF ALBANY, NEW YORK.

*Letters Patent No.* 12,382, *dated February* 13, 1855; *reissue No.* 3,009, *dated June* 30, 1868.

DIVISION 1.

IMPROVEMENT IN BASE-BURNING STOVES.

The Schedule referred to in these Letters Patent and making part of the same.

TO ALL WHOM IT MAY CONCERN:

Be it known that I, JAMES EASTERLY, of Albany, in the county of Albany, and State of New York, have invented a new and improved Smoke-Consuming Stove; and I do hereby declare that the following is a full, clear, and exact description of that part of my invention which relates to Division No. 1, reference being had to the accompanying drawings, making a part of this specification, in which—

Figure 1 is a perspective view of the stove.

Figure 2 is a vertical section through the centre of the stove.

Figure 3 is a section taken through the stove in the horizontal plane indicated by red line *x x* in fig. 2.

Similar letters of reference indicate corresponding parts in the several figures.

This invention relates to an improvement in the construction of base-burning stoves for warming purposes, whereby air is admitted into the combustion-chamber above the grate, so as to mix with the gaseous products and descend with them through the bed of incandescent fuel lying upon the grate, and thus effect a very perfect combustion and utilization of fuel.

To enable others skilled in the art to understand my invention, I will describe its construction and operation.

A represents the hearth-plate, on which stands the ash-pit B, having in its upper region the grate G, above which is the fire-chamber E, which is a cylinder of sufficient diameter and height to contain, when filled, enough burning fuel for customary use.

Above this stands the magazine M, which is a cylinder, less in diameter than the fire-chamber, and is as deep as may be found convenient and desirable for containing a proper supply of coal without renewing the same.

This magazine is closed tightly at top, so that no draught of air can enter it. The fire-chamber is less in diameter than the ash-pit, and from the top plate of the ash-pit, which projects beyond the fire-chamber, flues D D rise upwards, communicating above, and opening into an annular chamber, J, surrounding the magazine, and from which chamber a flue or pipe, P, carries off the heated air and gases into a chimney.

The ring which forms that part of the top of the fire-chamber lying between its outer walls and those of the magazine, is pierced with slots for the admission of air, and is covered with another and similar metal ring lying loose upon it, also pierced with corresponding slots *a a*, so that when it is turned round over the other, it may operate in the usual way as a register for the management of the draught of air to the fire.

The ash-pit is closed tight with a door, C, and may be perforated with openings in the metal, (of a star-form, in the drawings,) closed tight with talc glazing. Through these openings or windows *b b* the condition of the fire may be observed, which, when burning properly, will show a clear flame, free from smoke.

The operation of the stove is simply this: The fire being kindled in the fire-chamber E, the draught of air enters at *a a*, and passes downward through the grate G into the ash-pit, thence up the flues D into the chamber J, and through the pipe P into the chimney. The magazine M being filled with coal, and the top closed tight, the lower portion of the fuel presses down upon the burning mass in the fire-chamber, and becomes warmed by contact with it. This heats the coal and distills from it the sulphur, bitumen, &c., which, with their gases, pass down through the fire, and become consumed, leaving the coal converted into coke, to supply the waste of the burnt fuel.

The draught of air being admitted at *a a*, the coal stored above its line does not ignite, but is simply warmed and prepared for ignition as it approaches the fire-chamber.

It will be understood from the character of this apparatus and nature of its operation, that its form and arrangements may be varied considerably.

I do not, therefore, limit myself to the forms represented in the drawings, but claim the right to arrange the apparatus in any way that may substantially and appropriately carry out the principles of construction and use above set forth.

I do not claim the use of a fuel-magazine, nor of a downward draught for the fire, neither being novel arrangements in stoves.

Having described my invention, what I claim as new, and desire to secure by Letters Patent, is—

Constructing a stove, as herein described, with openings for the admission of air to the burning fuel at some point or points above the grate, including between said points and the grate sufficient fuel for ignition, at any one time, substantially as described.

JAMES EASTERLY.

Witnesses:

H. G. TEN EYCK,

L. MCINERNY.